United States Patent
Reddehase et al.

(10) Patent No.: US 6,955,473 B2
(45) Date of Patent: Oct. 18, 2005

(54) BUSHING JOINT

(75) Inventors: Günter Reddehase, Brockum (DE); Klaus Reilmann, Ankum (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 59 days.

(21) Appl. No.: 10/468,818

(22) PCT Filed: Nov. 7, 2002

(86) PCT No.: PCT/DE02/04134

§ 371 (c)(1),
(2), (4) Date: Aug. 19, 2003

(87) PCT Pub. No.: WO03/039895

PCT Pub. Date: May 15, 2003

(65) Prior Publication Data

US 2004/0066994 A1 Apr. 8, 2004

(30) Foreign Application Priority Data

Nov. 7, 2001 (DE) .......................... 101 54 193

(51) Int. Cl.⁷ ............................................. F16C 23/04
(52) U.S. Cl. ..................................... 384/192; 384/206
(58) Field of Search ..................... 384/192, 202–214; 267/140.12, 140.5; 248/609, 635

(56) References Cited

U.S. PATENT DOCUMENTS

| | | | |
|---|---|---|---|
| 3,188,152 A | | 6/1965 | Miller |
| 3,428,374 A | * | 2/1969 | Hudacko et al. ............ 384/213 |
| 4,213,512 A | | 7/1980 | Mazziotti |
| 5,061,087 A | * | 10/1991 | Roerig et al. ............... 384/192 |
| 5,224,790 A | * | 7/1993 | Hein .......................... 384/192 |
| 5,364,191 A | * | 11/1994 | Gruber ....................... 384/203 |
| 5,586,506 A | | 12/1996 | Heubusch et al. |
| 5,762,424 A | * | 6/1998 | Harris et al. ................ 384/299 |
| 5,993,065 A | | 11/1999 | Ladzinski et al. |
| 6,231,264 B1 | | 5/2001 | McLaughlin et al. |
| 6,325,544 B1 | * | 12/2001 | Sasaki et al. ............... 384/192 |

FOREIGN PATENT DOCUMENTS

| | | |
|---|---|---|
| DE | 26 08 553 | 9/1977 |
| DE | 26 24 430 | 12/1977 |
| DE | 27 52 456 | 5/1979 |
| DE | 29 16 982 | 11/1979 |
| DE | 94 20 230 | 5/1995 |
| DE | 199 32 678 | 5/2000 |
| EP | 0 567 002 | 10/1993 |
| EP | 0 770 506 | 5/1997 |
| EP | 0 900 677 | 3/1999 |
| FR | 2 038 659 | 1/1971 |
| GB | 1 516 572 | 7/1978 |
| GB | 1 571 565 | 7/1980 |
| GB | 2 058 239 | 4/1981 |

* cited by examiner

*Primary Examiner*—Thomas R. Hannon
(74) *Attorney, Agent, or Firm*—McGlew and Tuttle, P.C.

(57) ABSTRACT

A sleeve joint with a mount assembly unit (1) and with an inner part (2) is presented, in which the mount assembly unit (1) has a housing (3) as well as a bearing shell (4) inserted into the housing (3) for the slidingly movable mounting of a mount body (6) provided with a curved support surface (5). The mount body (6) is provided with a sliding layer (8) on its inner surface (7) facing away from the curved support surface. A sliding movement of the mount assembly unit (1) is made possible in the longitudinal direction of the sleeve joint as a consequence of the sliding contact between the mount assembly unit (1) and the inner part (2) associated with same.

19 Claims, 2 Drawing Sheets

BUSHING JOINT

FIELD AND BACKGROUND OF THE INVENTION

The present invention pertains to a sleeve joint as can be used mainly for connecting the stabilizer in motor vehicles. The rubber mounts used in this area so far tend to be worn prematurely as a consequence of the heavy burden of contaminants and corrosive media near the wheels. Moreover, the problem arises that during the springy movements of the wheel, the stabilizer has an excessive radial pretension, which overloads it in an undesired manner. In particular, a bending moment is undesirable for the stabilizer bar, because it impairs the response characteristic of the stabilizer bar during its normal operation in the motor vehicle. Stabilizers are regularly suitable and designed only for absorbing torsional stresses. Besides the risk of damage to the stabilizer, the rubber mount accommodating the stabilizer bar is, moreover, also squeezed, which may lead to the destruction of the inner molecular structure of such elastomer mounts, so that they will fail prematurely. The rubber mounts or sleeve joints used hitherto often have, moreover, the drawback of generating squeaky noises during the movement of the stabilizer, and the response characteristic and consequently the efficiency of the stabilizer are, moreover, also insufficient because of strong frictional effects.

SUMMARY OF THE INVENTION

The basic technical object of the present invention is to provide a sleeve joint that has low friction and can compensate both tilting movements and longitudinal movements of the component to be mounted.

According to the invention, a sleeve joint is provided with a mount assembly unit as well as an inner part. The mount assembly unit is composed of a housing as well as a bearing shell inserted into the housing for the slidingly movable mounting of a mount body provided with a curved support surface. The mount body is provided with a sliding layer on its inner surface facing away from the curved support surface. As a consequence of the sliding contact between the mount assembly unit and the inner part associated therewith, a sliding movement of the mount assembly unit is consequently possible in the longitudinal direction of the sleeve joint.

Such a sleeve joint according to the present invention has the advantage that an additional axial sliding mount was created here in addition to the known joint designs. Due to the separation of the bearing shell and the sliding layer, the selection of the material for these components can be optimized and correspondingly adapted to the special requirements imposed on them. It is thus possible to compensate the harmful effects of forces, which hitherto acted on the bearing as well as on the component to be mounted, by an axial movement. The axial mobility of the sleeve joint according to the present invention prevents, moreover, the introduction of bending forces into the component to be mounted. If this is a stabilizer for a motor vehicle, the response characteristic of the stabilizer as a whole is improved hereby.

For example, a stabilizer can be mounted in a motor vehicle very close to the wheel when a sleeve joint according to the present invention is used as a consequence of the compact design of the sleeve joint, so that, on the one hand, an increase in the efficiency of the stabilizer can be observed, and, on the other hand, the hitherto necessary rocker pendulums can be eliminated. The sleeve joint according to the present invention has, moreover, a simple design and can therefore be manufactured economically and at a low cost.

According to another embodiment of the present invention, it is proposed that the sleeve joint, sealed toward the outside, be designed with grease lubrication on the slidingly movable mount parts. Due to the grease lubrication and the selection of a suitable material for the grease to be used, the service life of a sleeve joint according to the present invention can be advantageously prolonged, on the one hand, and the squeaky noise, which has hitherto been felt as being disturbing in sleeve joints in extreme load situations, can be avoided, on the other hand. It would even be possible theoretically to use two different types of grease for the sliding mounting between the bearing shell and the mount body as well as for the sliding mounting between the inner part and the sliding layer, which may be definitely meaningful depending on the material pairing selected.

To prevent the penetration of contaminants and corrosive media such as oils or alkaline solutions or salt-containing liquids into the interior of the mount, the solution according to the present invention is improved such that it preferably has two sealing bellows, whose first edge area is inserted into a housing mount and whose second edge area is brought sealingly into contact with the inner part. Hermetic screening of the inner components of the sleeve joint against the environment is thus possible in a simple manner.

According to one embodiment of this idea, a groove in the outer surface of the housing or a closing ring, which is connected to the housing and receives the edge area of the sealing bellows, may be used as the housing mount. The closing ring may be connected to the housing in the known manner by deforming a housing edge, which is possible, e.g., by means of a rolling operation. However, to guarantee the dual function of the closing ring, the latter may also be used at the same time to fix the bearing shell within the housing and to optionally pretension same. The moments of friction within the mount assembly unit can be influenced specifically in a favorable manner due to this measure. Moreover, it is, of course, possible to fix the sealing bellows on the components associated with them by means of straining rings to achieve an improvement of their sealing.

In keeping with the object of the present invention, namely, to improve the friction within the sleeve joint as a whole, it is, moreover, proposed that the sliding layer be prepared from a low-friction plastic or a synthetic or rubber. The necessary coefficients of friction of the sliding pairing shall be taken into account here in selecting the material for the sliding layer. At any rate, it is meaningful according to the present invention for the material of the sliding layer to be an injection-moldable plastic rubber. This facilitates the processing of the material, so that it can also be injected, e.g., directly onto the mount body. As a result, the number of consecutive operations involved in the manufacture can be considerably reduced. However, it is also possible to prepare the sliding layer and the mount body separately from one another in order to subsequently connect them to one another by means of a press fit.

A sleeve joint according to the present invention has a decisive advantage over prior-art designs also because a grease-lubricated sliding mount is combined here with a pretensioned sliding mount corresponding to a meaningful embodiment of the present invention. Accordingly, it is meaningful to place the sliding layer on the inner part under pretension. As a result, the noise generation can be reduced or eliminated altogether, on the one hand, and clearance of the joint, which affects the parameters of the mount, can be prevented. Consequently, a friction-optimized sliding mount can be obtained with such a measure.

To guarantee the grease lubrication of a sleeve joint according to the present invention during the entire service life of the sleeve joint, it is, moreover, proposed that the sliding layer be provided with grease pockets filled with grease on its contact surface with the inner part. The grease can be prevented from escaping from the grease pockets in a simple manner by the sliding layer having a labyrinth seal on the same contact surface, the labyrinth seal being provided preferably but not obligatorily in the outer edge areas of the sliding layer. As a result, grease is thus effectively prevented from escaping even during movements of the parts of the sliding mount relative to one another for the axial movement of the mount assembly unit. The service life of such a sleeve joint according to the present invention can be decisively improved.

Moreover, it is proposed in the course of the simplification of the manufacture of the sleeve joint that the inner part be designed as a drawn, tubular component made preferably of aluminum. Aluminum is especially suitable because, on the one hand, it is an ideal friction partner and, on the other hand, it does not require any additional surface protection. Moreover, aluminum also offers considerable advantages in terms of weight compared with other materials.

According to another embodiment of the present invention, the inner part is preferably placed on the component to be mounted by means of a press fit. In order not to affect the sliding mount by this connection more than absolutely necessary, care should be taken to ensure that the press fit is provided in the area of the contacts between the edge areas of the sealing bellows and the inner part.

As was mentioned above, a stabilizer bar of a motor vehicle may be used as a component to be mounted. The press fit between the inner part and the component (stabilizer bar) to be mounted has the decisive advantage that no additional mounting steps are necessary to fix the sleeve joint according to the present invention in its specified position on the component to be mounted. Thus, the mounting is considerably simplified.

According to a highly advantageous variant of the present invention, the sleeve joint can be fastened directly to the lower suspension arm of a motor vehicle by means of a flanged bearing or by means of straps present on the housing. Such a mounting of the sleeve joint makes possible a wheel suspension without the hitherto necessary rocker pendulums. These components can be eliminated altogether, so that not only is a sleeve joint according to the present invention characterized by its advantageous, more economical manufacturability, but, moreover, the entire wheel suspension of a motor vehicle can be considerably simplified and hence improved.

With the sleeve joint presented here according to the invention being described here, a sleeve joint was created for the first time that has an additional axial sliding mount. It is designed as a closed sleeve joint with grease lubrication and thus it has an axial displacing function. The wear characteristic was able to be considerably improved. In addition, disturbing squeaky noises can be avoided in the area of the wheel suspension of the motor vehicle. Due to the compact design of a wheel-side stabilizer mount, which does not introduce bending forces into the stabilizer on the frame side in case of a correspondingly designed mount, an overall improvement is thus achieved in the response characteristic of the stabilizer in a motor vehicle. The stabilizer mount may be positioned very far out at the suspension arm on the wheel side. As a result, the response characteristic of the stabilizer is likewise improved, and the wheel suspension is qualitatively optimized.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
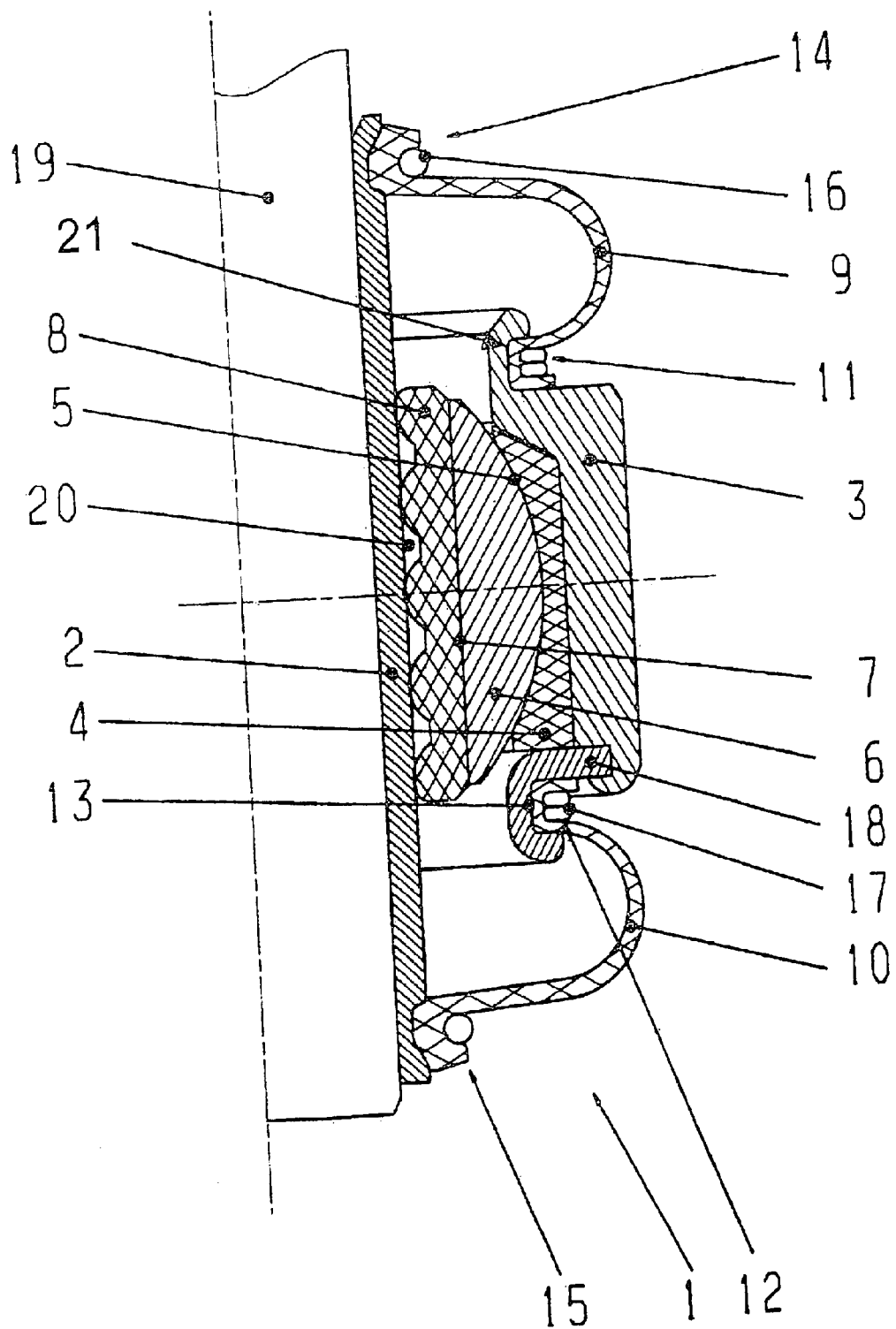
FIG. 1 is a sectional view of a detail of a sleeve joint according to the present invention.

Referring to the drawings in particular, FIG. 1 shows a detail of a sectional view through a preferred exemplary embodiment of a sleeve joint according to the present invention. This sleeve joint comprises a mount assembly unit designated by 1 as a whole, which is connected to an inner part 2 via a sliding mount in an axially displaceable manner. The mount assembly unit 1 comprises in turn a housing 3, into which a bearing shell 4 made of a plastic is inserted. On its inner side facing away from the inner surface of the housing, the bearing shell 4 has a curved support surface having a shape complementary to the mount body 6. The mount body 6 consequently has a curved support surface 5 which is slidingly movable in the bearing shell 4. On its inner surface 7 facing away from the bearing shell 4, the mount body 6 has a sliding layer 8. This sliding layer 8 is directly in sliding contact with the inner part 2 under pretension. To improve the coefficients of friction, grease pockets 20, which act as grease reservoirs and into which lubricating grease is introduced, are formed on the sliding layer 8. The inner part 2 is placed on the component to be mounted, which is designed as a stabilizer bar 19 by means of a press fit. To protect the sensitive inner components of the sleeve joint according to the present invention against the penetration of contaminants or corrosive media, the sleeve joint shown in FIG. 1 has a sealing bellows 9 and 10 each on each of its axially outer sides. The sealing bellows 9, 10 have a first edge area 11 and 12, respectively, as well as a second edge area 14 and 15, respectively. The first edge area 11, 12 of the sealing bellows 9, 10 is inserted into a housing mount 13. FIG. 1 shows two different possibilities of fastening this first edge area of the sealing bellows. In the upper part of the figure, the first edge area 11 of the sealing bellows 9 is mounted within a groove 21 in the housing 3. It is pressed into this groove 21 by means of a straining ring 17. In the lower part of FIG. 1, the edge area 12 of the sealing bellows 10 is inserted into a closing ring 18 and is held within this closing ring 18 by means of a straining ring 17. The closing ring 18 is in turn nondetachably connected to the housing 3 by a deformed rolled edge of the housing 3. It is used at the same time as an axial securing means for the bearing shell 4 within the housing 3. A straining ring 16, which fixes the edge areas 14 and 15 of the sealing bellows, is used to fix the second edge areas 14 and 15 of the respective sealing bellows 9 and 10 on the inner part 2 and thus to achieve the sealing of the sleeve joint.

Figure 2:
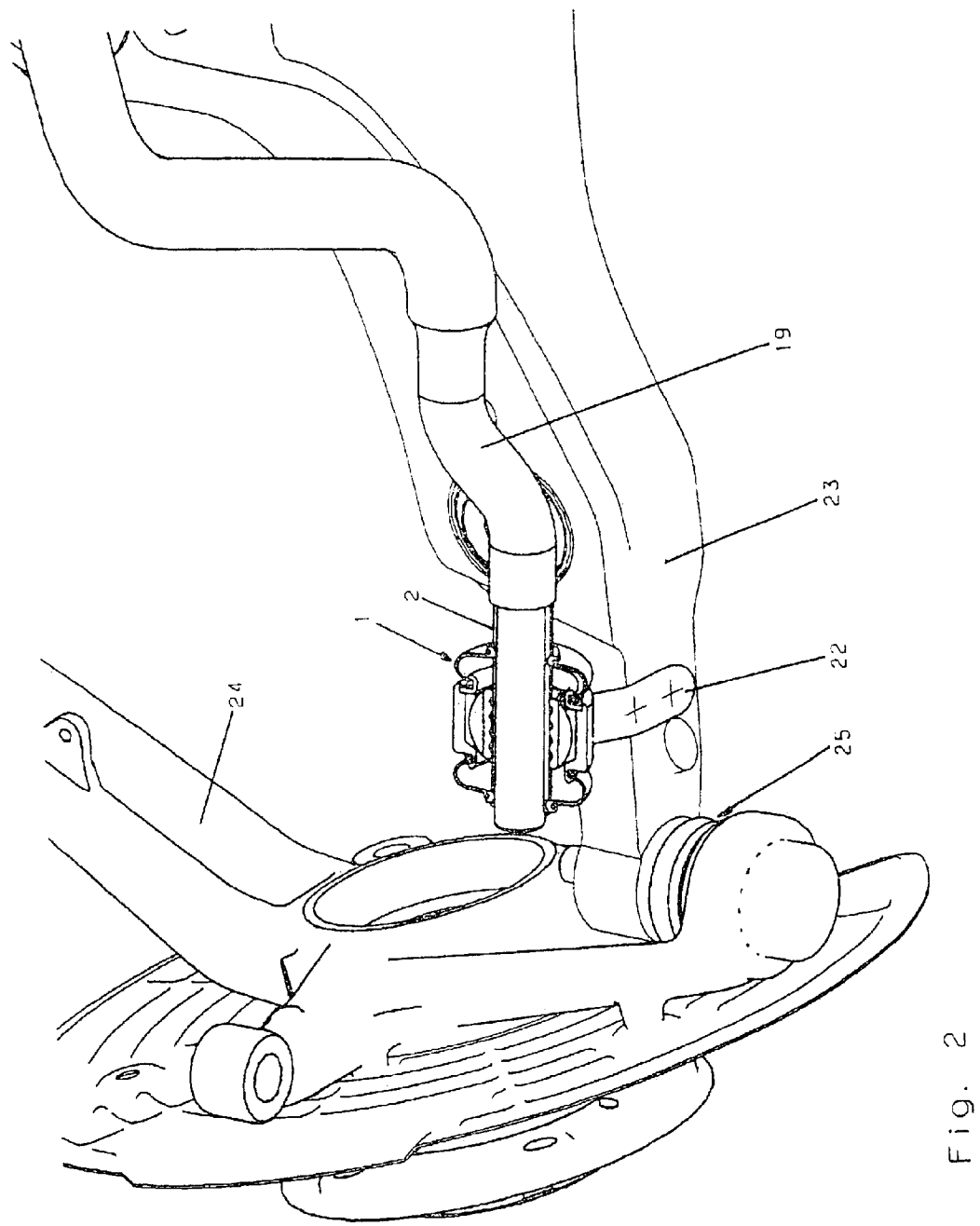
FIG. 2 is a detail of a part of a wheel suspension of a motor vehicle with a sleeve joint according to the present invention.

FIG. 2 shows a detail of part of a wheel suspension of a motor vehicle with a sleeve joint according to the present invention. The sleeve joint, comprising the mount assembly unit 1, which is placed on the inner part 2 slidingly movably in the longitudinal direction of the sleeve joint, is fastened by means of a flange 22 on a suspension arm 23 of a motor vehicle wheel suspension in the view shown in FIG. 2. A screw connection, which is only indicated by crosses at the flange 22 in the drawing, is used for the mounting. The flange 22 is made in one piece with the housing 3 of the sleeve joint in the embodiment being shown, i.e., it is made in one piece with the housing. The suspension arm 23 is connected to a wheel carrier or steering knuckle 24 of the wheel suspension by means of a ball-and-socket joint 25 designed as a support joint. Rocker pendulums may be eliminated due to the use of a sleeve joint according to the present invention in a wheel suspension.

What a specific embodiment of the invention has been shown and described in detail to illustrate the application of the principles of the invention, it will be understood that the invention may be embodied otherwise without departing from such principles.

What is claimed is:

1. A sleeve joint comprising:
a mount assembly unit; and
an inner part, wherein said mount assembly unit has a housing as well as a mount body and a bearing shell inserted into said housing for the slidingly movable mounting of said mount body provided with a curved support surface, and said mount body is provided with a sliding layer on an inner surface facing away from said curved support surface, so that sliding movement of said mount assembly unit in the longitudinal direction of the sleeve joint is made possible as a consequence of the sliding contact between said mount assembly unit and said inner part associated therewith, said sliding layer being placed on said inner part under pretension.

2. A sleeve joint in accordance with claim 1, wherein said sleeve joint, which is sealed by a seal to the outside, has a grease lubrication for said slidingly movable mount parts.

3. A sleeve joint in accordance with claim 1, wherein said sliding layer consists of a low-fiction plastic or a synthetic rubber.

4. A sleeve joint in accordance with claim 3, wherein the material of said sliding layer can be injection molded.

5. A sleeve joint in accordance with claim 1, wherein said sliding layer is inserted into said mount body by means of a press fit.

6. A sleeve joint in accordance with claim 1, wherein said sliding layer has grease-filled grease pockets on its contact surface with said inner part.

7. A sleeve joint in accordance with claim 1, wherein on its contact surface with said inner part, said sliding layer has a labyrinth seal, which is arranged at the outer edge areas of said sliding layer.

8. A sleeve joint in accordance with claim 1, wherein said inner part is a drawn, tubular component.

9. A sleeve joint in accordance with claim 8, wherein said drawn, tubular component is made of aluminum.

10. A sleeve joint arrangement comprising:
a mount assembly unit with a housing, a mount body with a curved support surface and with a sliding layer facing away from said curved support surface and a bearing shell inserted into said housing for the slidingly movable mounting of said mount body along said curved support surface;
an inner part, sliding contact between said mount assembly unit sliding layer and said inner part allowing sliding movement of said mount assembly unit in a longitudinal direction of the sleeve joint arrangement;
a component, said inner part being press fit on said component.

11. A sleeve joint arrangement in accordance with claim 10, further comprising: a housing mount and a sleeve joint seal for sealing to the outside, said seal having grease lubrication for slidingly movable mount parts, wherein said seal of the sleeve joint comprises two sealing bellows having a first edge area inserted into said housing mount and having a second edge area brought sealingly into contact with said inner part.

12. A sleeve joint comprising:
a mount assembly unit;
an inner part, wherein said mount assembly unit has a housing as well as a mount body and a bearing shell inserted into said housing for the slidingly movable mounting of said mount body provided with a curved support surface, and said mount body is provided with a sliding layer on an inner surface facing away from said curved support surface, so that sliding movement of said mount assembly unit in the longitudinal direction of the sleeve joint is made possible as a consequence of the sliding contact between said mount assembly unit and said inner part associated therewith;
a housing mount, and wherein said seal of the sleeve joint comprises two sealing bellows having a first edge area inserted into said housing mount and having a second edge area brought sealingly into contact with said inner part.

13. A sleeve joint in accordance with claim 12, wherein said housing mount is a groove in an outer surface of said housing or a closing ring, which is connected with said housing and receives said edge area (11, 12) of said sealing bellows.

14. A sleeve joint in accordance with claim 12, wherein said sealing bellows are fixed on said associated components by said straining rings.

15. A sleeve joint comprising:
a mount assembly unit;
an inner part, wherein said mount assembly unit has a housing as well as a mount body and a bearing shell inserted into said housing for the slidingly movable mounting of said mount body provided with a curved support surface, and said mount body is provided with a sliding layer on an inner surface facing away from said curved support surface, so that sliding movement of said mount assembly unit in the longitudinal direction of the sleeve joint is made possible as a consequence of the sliding contact between said mount assembly unit and said inner part associated therewith, said sleeve joint being placed on a stabilizer bar of a motor vehicle.

16. A sleeve joint in accordance with claim 15, wherein the connection between said stabilizer bar and said inner part of said sleeve joint is a press fit.

17. A sleeve joint comprising:
a mount assembly unit with a housing, a mount body with a curved support surface and with a sliding layer facing away from said curved support surface and a bearing shelf inserted into said housing fur the slidingly movable mounting of said mount body along said curved support surface;
an inner part, sliding contact between said mount assembly unit sliding layer and said inner part allowing sliding movement of said mount assembly unit in a longitudinal direction of the sleeve joint;

a housing mount and a sleeve joint seal for sealing to the outside, said seal having grease lubrication fur slidingly movable mount parts, wherein said seal of the sleeve joint comprises two sealing bellows having a first edge area inserted into said housing mount and having a second edge area brought sealingly into contact with said inner part.

18. A sleeve joint comprising:

a mount assembly unit;

an inner part, wherein said mount assembly unit has a housing as well as a mount body and a bearing shell inserted into said housing for the slidingly movable mounting of said mount body provided with a curved support surface, and said mount body is provided with a sliding layer on an inner surface facing away from said curved support surface, so that sliding movement of said mount assembly unit in the longitudinal direction of the sleeve joint is made possible as a consequence of the sliding contact between said mount assembly unit and said inner part associated therewith, said sliding layer has a labyrinth seal on its contact surface with said inner part which is arranged at the outer edge areas of said sliding layer.

19. A sleeve joint comprising:

a mount assembly unit;

an inner part, wherein said mount assembly unit has a housing as well as a mount body and a bearing shell inserted into said housing for the slidingly movable mounting of said mount body provided with a curved support surface, and said mount body is provided with a sliding layer on an inner surface facing away from said curved support surface, so that sliding movement of said mount assembly unit an the longitudinal direction of the sleeve joint is made possible as a consequence of the sliding contact between said mount assembly unit and said inner part associated therewith, said sleeve joint being fastened directly to the lower suspension arm of a motor vehicle by means of a flanged bearing or by means of at least one strap present on said housing or by means of a flange.

* * * * *